Sept. 5, 1933.　　　　　D. W. HICKEY　　　　　1,925,383
PIPE CUTTING AND WELDING MACHINE
Filed Nov. 5, 1931　　　　2 Sheets-Sheet 1

Inventor
Daniel W. Hickey
By Stryker & Stryker
Attorneys

Sept. 5, 1933.　　　　D. W. HICKEY　　　　1,925,383
PIPE CUTTING AND WELDING MACHINE
Filed Nov. 5, 1931　　　　2 Sheets-Sheet 2
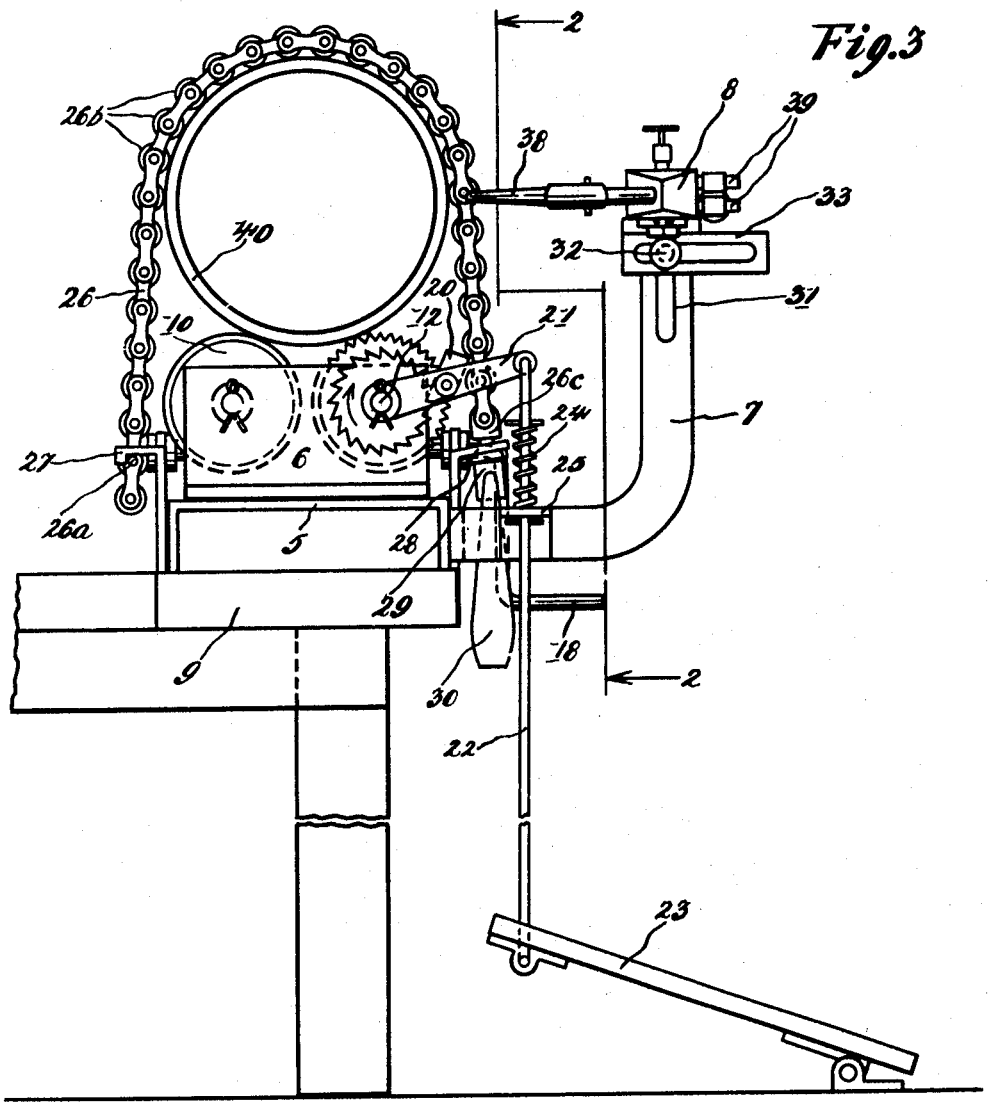
Fig.3
Fig.4
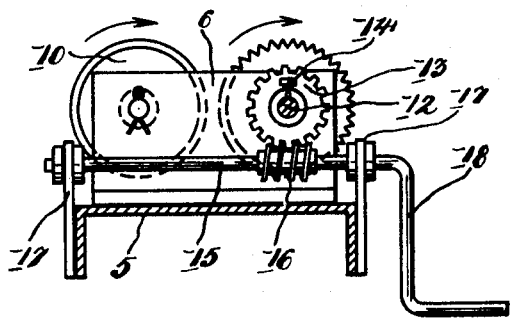
Inventor
Daniel W. Hickey
By Stryker & Stryker
Attorneys Patented Sept. 5, 1933

1,925,383

UNITED STATES PATENT OFFICE 1,925,383

PIPE CUTTING AND WELDING MACHINE

Daniel W. Hickey, St. Paul, Minn.

Application November 5, 1931. Serial No. 573,196

12 Claims. (Cl. 266—23)

It is the object of this invention to provide a novel and inexpensive machine adapted to facilitate the welding and cutting of pipes of the larger sizes.

A further object is to provide a machine of this kind designed to hold and turn pipes of widely different sizes in proper relation to a torch and having mechanism for turning the pipe at the various speeds required for the operations of heating, cutting and welding.

Another object is to provide a machine of this kind adapted to be operated by a single workman and whereby work of high quality is facilitated even when the pipes to be worked upon are of large diameter and great weight.

The invention also includes certain other novel features of construction which will be more fully pointed out in the following specification and claims.

Referring to the accompanying drawings;

Fig. 3 is an end view of the machine with a pipe in place and mounted on a suitable support; and Fig. 4 is a vertical section taken on the line 4—4 of Fig. 1.

Figure 1:
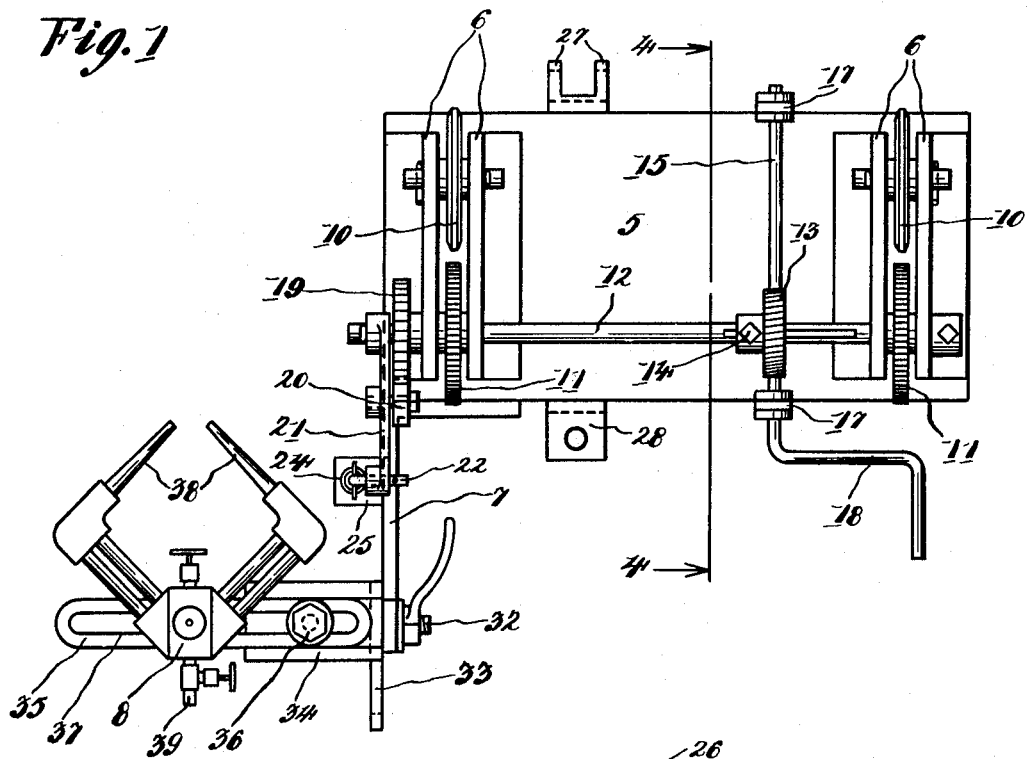
Figure 1 is a plan view of my improved machine with the pipe and chain holder removed to show parts otherwise concealed.
Figure 2:
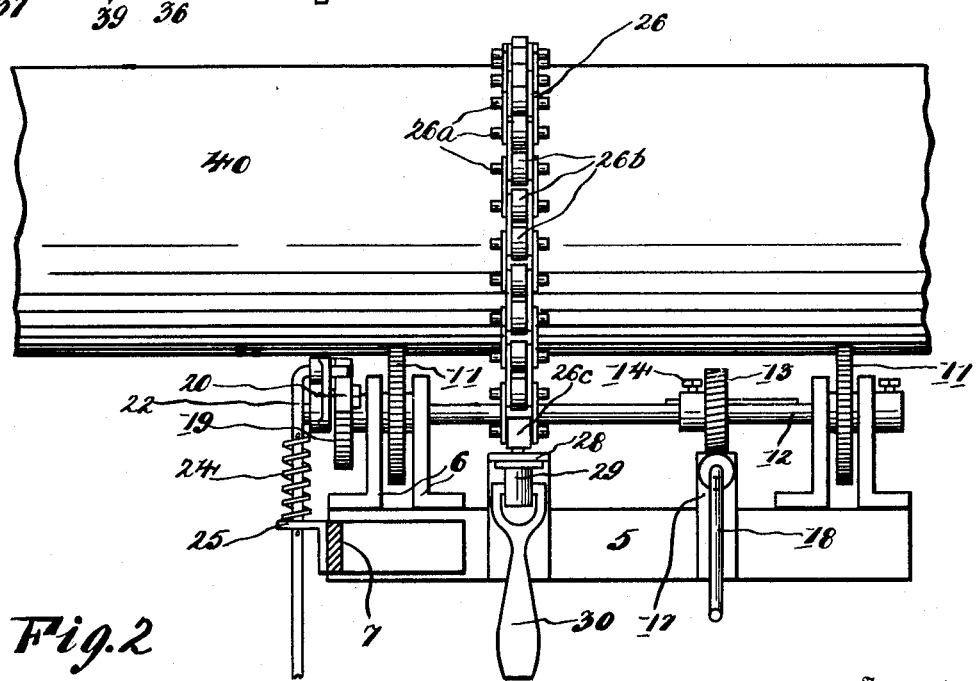
Fig. 2 is a fragmentary, side elevation of the machine and pipe taken on the line 2—2 of Fig. 3.

My device has a rigid frame consisting of a base 5, a series of upstanding bearing members 6 and an arm 7 to support a torch 8. The base 5 may be placed on a work bench 9 (Fig. 3) or other suitable support. The bearing members 6 of the frame are arranged in pairs and extend across the machine in parallel relation to each other, being secured to the base 5. Between each pair of the members 6 is mounted a freely revoluble wheel 10 and a toothed, drive wheel 11 both arranged to engage the periphery of a pipe. Stability of support is secured by my arrangement of the wheels 10 and 11 forming seats for the pipe which are widely spaced longitudinally of the pipe and also spaced on the periphery thereof. The wheels 11 are fixed on a horizontal shaft 12 having bearings on the members 6 and a worm wheel 13 has a splined connection with the shaft 12 and is normally held against longitudinal movement by a set screw 14. Extending transverse the shaft 12, beneath the same, is a shaft 15 carrying a worm 16 for driving the worm wheel 13. Suitable bearing arms 17 project upward from the base 5 to support the shaft 15 and one end of said shaft is provided with a crank 18 to be manipulated for turning the pipe.

An end of the shaft 12 has fixed thereon a ratchet wheel 19 adapted to be engaged by a pawl mounted on an arm 21. This arm is pivoted at one end on the shaft 12 and has a downwardly extending rod 22 connected to its other end. Joined to the lower extremity of the rod 22 is a foot lever 23 which is supported by a spring 24 confined on said rod above a guide bracket 25.

To retain any of a number of pipes of different sizes in engagement with the seats formed by the wheels 10 and 11, I provide a chain 26 having projecting members 26a at each link for removably engaging claw fingers 27 secured to the base 5 at one side. At the opposite side of said base, a bracket 28 projects and is perforated to receive a screw-threaded stud 26c attached to an end of the chain 26. The lower end of the stud 26c is fitted with a nut 29 having a swiveled handle 30 to facilitate tightening the chain 26. Each link of the chain 26 has an anti-friction roller 26b for engaging the periphery of a pipe to be worked upon.

The bracket arm 7, for supporting the torch 8, has an elongated, vertically extending slot 31 to receive a clamping bolt 32 whereby a horizontally slotted arm member 33 may be secured in various positions relative to the arm 7. Extending horizontally from the member 33, and integral therewith, is a plate 34 on the top of which is slidably mounted an arm member 35, a clamping bolt 36 being provided to engage the member 35 at the sides of a long, horizontal slot 37 formed in said member. The torch 8 is secured to the member 35 by a bolt extending in the slot 37. This torch has nozzles 38 extending at right angles to each other to direct two jets of flame against a pipe. Oxygen and a suitable fuel are supplied to the torch through pipes connected to a pair of nipples 39 and suitable valves are arranged to permit control of the composition or mixture supplied to the jets 38.

A pipe to be operated on is indicated by the numeral 40. When such a pipe is to be cut or welded, it is merely placed on the seat formed by the pairs of wheels 10 and 11 and is secured in place by applying the chain 26. The free end of this chain is placed over the upper periphery of the pipe and drawn downward between the claw fingers 27 until it is approximately tight and has one of the projecting pins 26a in engagement with the lower side of said fingers. Final adjustment of the chain is secured by turning the nut 29 to take up any remaining slack and to create the desired pressure between the toothed wheels 11 and pipe. The torch 8 is adjusted so that the flame is properly directed against the periphery of the pipe. The first step in the use of the torch is usually a preliminary heating of the pipe around its periphery where it is to be cut or welded. With the torch in operation to produce a suitable flame for heating, the crank 18 is turned to rotate the worm 16 and worm wheel 13 and thereby rotate the shaft 12 upon which the toothed wheels 11 are fixed. Rotation of these wheels causes the pipe to be turned in proper relation to the torch and the speed of rotation may be readily regulated by the operator.

A different speed of rotation of the pipe and fuel composition for the torch is required for the cutting. After the preliminary heating, and suitable adjustments of the fuel and oxygen supplies to the torch, the pipe may be cut while the crank 18 is turned. To perform the operation of welding, both hands of the operator are usually needed for directing the torch and welding rod and the foot lever 23 may be employed to turn the pipe. For such operation, the worm wheel 13 is rendered inoperative by loosening the set screw 14 and sliding said wheel out of mesh with the worm 16. The desired slow rotation of the pipe for welding may now be secured by the operation of the foot lever 23. As the welding progresses, the operator periodically depresses the lever 23 so that at each stroke of said lever the shaft 12 is rotated through a small arc by the operation of the pawl 20 on the ratchet wheel 19. The spring 24 raises the lever and pawl after each downward stroke.

It will now be understood that the machine is adapted for use with pipes of widely different diameters and substantially no time need be lost in changing from one size to another. Simple adjustments of the effective length of the chain 26 and of the position of the torch 8 to properly direct the flame jets for the larger or smaller pipe is all that is required. The machine greatly facilitates the formation of a uniform cut or weld, properly squared or extending at a predetermined angle to the axis of the pipe.

Having described my invention, what I claim as new and desire to protect by Letters Patent is:

1. In a machine of the class described, a pair of wheels forming a seat for a pipe, means for securing a pipe on said seat, means for rotating one of said wheels to turn said pipe and means for supporting a torch in position to direct a flame against the periphery of said pipe.

2. In a machine of the class described, a pair of wheels forming a seat for a pipe, means adjustable to fit pipes of different sizes and arranged to hold a pipe on said seat in contact with the periphery of said wheels and means for rotating said pipe.

3. In a machine of the class described, a frame, a pair of wheels mounted in axial alignment with each other on said frame, a second pair of wheels disposed on said frame adjacent to said first mentioned wheels, means, adjustable to fit pipes of different sizes, for retaining a pipe in contact with said wheels and means for rotating a pair of said wheels to turn said pipe.

4. In a machine of the class described, pairs of wheels arranged to engage the periphery of a pipe at points spaced longitudinally thereof, a chain adapted to embrace the periphery of a pipe to hold it in contact with said wheels, means for rotating at least one of said wheels to rotate said pipe and means for supporting a torch in proximity to said pipe.

5. In a machine of the class described, a pair of wheels forming a seat for a pipe, a chain adapted to embrace the periphery of said pipe to hold it in contact with said wheels, means for rotating said pipe and means for supporting a torch comprising a series of slidably connected members adapted to be secured in different relative positions to adjust the position of a torch thereon in relation to said pipe.

6. In a machine of the class described, pairs of wheels arranged to engage the periphery of a pipe at points spaced longitudinally thereof, anti-friction means adapted to engage the periphery of a pipe to hold it in rolling contact with said wheels, means for rotating at least one of said wheels to rotate said pipe and means for supporting a torch comprising a series of slidably connected members adapted to be secured in different relative positions to adjust the position of a torch thereon in relation to said pipe.

7. A pipe turning machine having in combination a frame, pairs of wheels supported on said frame and arranged to engage the periphery of a pipe at points spaced longitudinally of the pipe and circumferentially thereof, means having anti-friction contact elements for engaging a pipe to retain a pipe in rolling contact with said wheels and means for turning at least one of said wheels to turn said pipe.

8. A pipe cutting and welding machine having in combination a frame, pairs of wheels supported on said frame and arranged to engage the periphery of a pipe at points spaced longitudinally of the pipe and circumferentially thereof, a chain having anti-friction contact elements for engaging a pipe, means connecting the ends of said chain to said frame, means for tightening said chain to retain a pipe in rolling contact with said wheels, means for turning said pipe and means for supporting a torch in position to direct a flame against the periphery of a pipe on said wheels.

9. A pipe welding and cutting machine having in combination a frame, wheels arranged on said frame to form a seat for revolubly supporting a pipe, a chain having anti-friction contact elements for engaging a pipe, means connecting said chain to said frame to retain a pipe in rolling contact with said wheels, means for turning at least one of said wheels to turn said pipe and means for supporting a torch in position to direct a flame against the periphery of a pipe on said wheels.

10. In a machine of the class described a frame, anti-friction means on said frame for revolubly supporting a pipe, means for supporting a torch adjacent to said pipe and means for rotating said pipe comprising a toothed member revolubly engaging said pipe, an operating lever and connections between said toothed member and lever whereby said toothed member may be rotated upon the operation of said lever.

11. In a machine of the class described a frame, anti-friction means on said frame for revolubly supporting a pipe, means for supporting a torch adjacent to said pipe and means for rotating said pipe comprising a toothed wheel engaging said pipe, an operating lever and connections between said lever and wheel including a ratchet and pawl whereby said toothed wheel may be rotated upon the operation of said lever.

12. In a machine of the class described anti-friction means forming a seat for revolubly supporting a pipe, a chain arranged to retain a pipe on said seat, means for supporting a torch adjacent to said pipe and means for rotating said pipe comprising a toothed member engaging said pipe, an operating lever and connections including a ratchet and pawl whereby said toothed member may be rotated upon the operation of said lever.

DANIEL W. HICKEY.